United States Patent
Robertson et al.

(10) Patent No.: US 11,060,328 B2
(45) Date of Patent: Jul. 13, 2021

(54) LATCHING DEVICE FOR AUTOMOTIVE APPLICATIONS

(71) Applicant: Kiekert AG, Heiligenhaus (DE)

(72) Inventors: Keith Robertson, Livonia, MI (US); Jim Zhuang, Canton, MI (US); Philip Morrison, Monroe, MI (US)

(73) Assignee: Kiekert AG, Heiligenhaus (DE)

( * ) Notice: Subject to any disclaimer, the term of this patent is extended or adjusted under 35 U.S.C. 154(b) by 518 days.

(21) Appl. No.: 15/985,886

(22) Filed: May 22, 2018

(65) Prior Publication Data
US 2019/0360242 A1   Nov. 28, 2019

(51) Int. Cl.
| | |
|---|---|
| *E05B 81/14* | (2014.01) |
| *B60N 2/36* | (2006.01) |
| *E05B 81/34* | (2014.01) |
| *E05B 85/26* | (2014.01) |

(52) U.S. Cl.
CPC .............. *E05B 81/14* (2013.01); *B60N 2/366* (2013.01); *E05B 81/34* (2013.01); *E05B 85/26* (2013.01)

(58) Field of Classification Search
CPC .......... E05B 81/14; E05B 81/34; E05B 85/26; B60N 2/366
See application file for complete search history.

(56) References Cited

U.S. PATENT DOCUMENTS

| | | | |
|---|---|---|---|
| 9,199,554 B2 * | 12/2015 | Muller | B60N 2/366 |
| 2005/0023877 A1 * | 2/2005 | Vermeulen | B60N 2/366 |
| | | | 297/378.13 |
| 2011/0012415 A1 * | 1/2011 | Muller | B60N 2/01583 |
| | | | 297/378.13 |
| 2019/0143868 A1 * | 5/2019 | Dey | E05B 81/06 |
| | | | 297/378.12 |

FOREIGN PATENT DOCUMENTS

| | | |
|---|---|---|
| DE | 102004056086 B3 | 1/2006 |
| WO | 2009/149684 A1 | 12/2009 |
| WO | 2015113547 A1 | 8/2015 |
| WO | 2015172761 A1 | 11/2015 |
| WO | 2017/195023 A1 | 11/2017 |

OTHER PUBLICATIONS

International Search Report and Written Opinion dated Sep. 24, 2019, for International Patent Application No. PCT/IB2019/054091.

* cited by examiner

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A latching device for a backrest latch of a motor vehicle for the bolting and unbolting of seat backrests includes a locking mechanism having a catch and at least one pawl, and an unbolting element for the locking mechanism which can be acted on manually and/or mechanically, whereby the unbolting element is a component of an exchangeable unbolting module and whereby the unbolting module forms a latch housing together with a basic module accommodating the locking mechanism, whereby the unbolting element is formed as a multifunctional element and whereby at least a switching and/or attenuation function can be executed by the multifunctional element.

10 Claims, 2 Drawing Sheets

LATCHING DEVICE FOR AUTOMOTIVE APPLICATIONS

FIELD OF INVENTION

The invention relates to a latching device for automotive applications, in particular to a backrest latch to bolt and unbolt seat backrests in motor vehicles, with a locking mechanism having as essential components a catch and at least one pawl, and further with an unbolting element for the locking mechanism which can be acted on manually and/or mechanically, whereby the unbolting element is a component of an exchangeable unbolting module and whereby the unbolting module forms a latch housing together with a basic module accommodating the locking mechanism.

BACKGROUND OF INVENTION

Latching devices for automotive applications are used where pivoting or shifting components need to be secured in position on the vehicle. The latching device works together with a latch holder to secure the position of the moving components, whereby a movement of the latching device relative to the latch holder moves the locking mechanism into a locked position. Usage areas include flaps, doors and sliding doors, but also, for example, backrest bolts for rear seat benches in the motor vehicle passenger compartment. Hereby the rear seat bench or backrest can be moved from a nearly vertical position into a vertical position by unbolting of the latching device in order, for example, to facilitate boarding or to provide a larger loading area.

In order to be able to install the latching device into the seat backrest, but also in the area of the seat backrest in the vehicle, it is necessary for the latching device to be of a compact design. If a compact design is a criterion for construction on the one hand, on the other hand great convenience must be provided for the vehicle user.

Convenience in the case of such latching devices is provided by triggering forces, for example. Easy unlocking of the locking mechanism offers the user a high degree of convenience as the driver needs to reach into the area of the seat backrest to manually act on the unbolting mechanism.

Such a latching device, which works with low unlocking forces, has become known from WO 2009/149684 A1, for example. This latching device for automotive applications and in particular for backrest latches for the bolting and unbolting of seat backrests works with locking mechanisms which regularly work with two pawls in one locking mechanism. The first pawl assumes the actual and original latching function, therefore functions as a latching pawl so to speak, while the other second locking pawl functions as a blocking pawl. The blocking pawl prevents unlocking of the locking mechanism, whereby the locking mechanism has an opening moment, i.e. in the case of pivoting of the blocking pawl fundamentally opens the locking mechanism independently. Convenient easy unlocking of the locking mechanism is thus enabled.

Convenience can be increased further by an electrical drive being provided to unlock the locking mechanism. A two-part construction of the latching device is preferably used here, whereby the unlocking module and a basic module together form a latch housing. A motor vehicle door latch is known from DE 103 36 949 A1 with a locking mechanism and a basic module, whereby the locking mechanism is accommodated, if applicable, in conjunction with other latch components in the basic module and forms a basic module together with this and whereby the basic module is set up with a drive to open the locking mechanism to accommodate an unbolting module. The locking mechanism can be opened by means of an electromotor due to this assembly consisting of the unbolting module and the basic module.

A class-specific state of the art is formed by WO 2017/195023 A1. The publication reveals a latching device with a locking mechanism and an unbolting element for the locking mechanism that can be acted on manually and/or mechanically, whereby the unbolting element is a component of an exchangeable unbolting module and whereby the unbolting module forms a latch housing together with a basic module accommodating the locking mechanism.

The previously described concepts of manual or also motorized unbolting of such backrest latches have been tried and tested in principle. However, in order to fulfill the ever increasing demands for convenience in motor vehicles, improvements are necessary to increase safety and functionality. This is where the invention is used.

SUMMARY OF INVENTION

The task of the invention is to provide a latching device for automotive applications which provides greater convenience and, in particular, a higher degree of safety and functionality. Another task of the invention is to provide a compact design and a structurally simple and cost-effective solution for a latching device.

The task is solved by the characteristics of the disclosure. Advantageous embodiments of the invention are stated in the disclosure. It is pointed out that the exemplary embodiments described hereafter are not restrictive; instead, any variations are possible of the characteristics described in the disclosure.

The task of the invention is solved by a latching device for automotive applications being provided, in particular a backrest latch to bolt and unbolt seat backrests in motor vehicles, with a locking mechanism having as essential components a catch and at least one pawl, and further with an unbolting element for the locking mechanism which can be acted on manually and/or mechanically, whereby the unbolting element is a component of an exchangeable unbolting module and whereby the unbolting module forms a latch housing together with a basic module accommodating the locking mechanism, whereby the unbolting element is formed as a multifunctional element and whereby at least a switching and/or attenuation function can be executed by means of the multifunctional element. The functionality and safety of the latching device can be increased by the construction of the latching device according to the invention. The unbolting element can assume a large number of functions by the use of an unbolting element as a multifunctional element which, on the one hand, monitors a switching state, for example, and/or has a positive impact on the noise behavior on the other hand. The multifunctionality of the unbolting element can assume a large number of functions, which in turn benefits a compact construction of the latching device. Thus, functionality can be increased, whereby safety and convenience are improved.

The latching device has a locking mechanism which comprises a catch and at least one pawl. At least one pawl is preferably arranged in a same plane with the catch and is able to lock the catch in a position in interplay with a latch holder. In the case of an opened locking mechanism, an infeed section of the catch points in the direction of a latch holder, whereby a pivoting of the catch occurs by means of a relative movement between the latch holder and the catch.

The pawl is generally pre-tensioned by a spring in the direction of the catch so that the pawl engages with the catch when a ratchet position is reached. A pre-ratchet position and a main ratchet position of the locking mechanism can hereby be assumed.

Advantageously, the latching device can have a ratchet or blocking lever in addition to the pawl which maintains the pawl in the locking position. In this case, the locking mechanism consisting of the catch and the pawl has an opening torque at least in the main ratchet position, i.e. the locking mechanism opens independently by means of the force initiated in the locking mechanism. The blocking or ratchet lever maintains the pawl in its locking position, whereby the pivoting out of the blocking or ratchet lever from the engagement area with the pawl enables independent opening of the locking mechanism. The ratchet or blocking lever is preferably moved out of the engagement area with the pawl by means of the unbolting element.

The latching device according to the invention can have a manual and/or motorized construction, whereby the unbolting element can be pivoted manually and/or mechanically.

The unbolting element is a component of an unbolting module, whereby the unbolting module can be screwed or clipped onto the basic module, for example. In other words, a detachable and/or non-detachable connection can be produced between the unbolting module and the basic module. The unbolting module comprises at least the pivotably accommodated unbolting element and/or the electrical drive for the unbolting element.

By means of the unbolting element, the pawl and/or the ratchet lever and, according to the invention, at least one switching means and/or an attenuation function can be operated.

The basic module comprises the locking mechanism and, if used, a ratchet or blocking lever, as well as bearing points for the catch, the pawl and the ratchet lever. The catch, pawl and ratchet lever are preferably pre-tensioned with a spring. Due to the assembly of the unbolting module and the basic module, the unbolting element reaches an engagement position or directly engages with the components of the basic module. The unbolting element or the multi-functional element preferably engages with the ratchet lever and goes into an engagement position to operate the pawl.

In one embodiment of the invention, the multifunctional element is pivotably accommodated in the unbolting module and has a circle segment-shaped, in particular a consistently circle segment-shaped, surface area. A circle segment-shaped formation of the surface area of the multifunctional element offers the advantage of high stability so that a high degree of functional reliability can be guaranteed. In particular, actuating movements in the latching device can also be executed with higher triggering forces. Furthermore, several functional elements can be positioned or arranged on the surface area so that a large number of functions can be executed by means of the multifunctional element. In particular, an operating pin for the ratchet lever and a further operating pin for engagement into the pawl can be arranged on the surface area. Furthermore, it is also conceivable to provide control contours for switching means on the surface area.

If the multifunctional element has at least a contour formed on the surface area, whereby the contour can be engaged with a switching means, a further design variant of the invention thus results. The contour can be radially circumferential so that slight engagement into the switching means can be enabled, but it can also be formed in the form of an elevation, a pin or an oblique surface. According to the switching means, it can be advantageous for a sharp contour to engage with the switching means, as is advantageously the case for an echo sensor or continual engagement can occur, in order to expose a switching means to the least possible mechanical stress, for example. The contour is preferably formed as a single component with the surface area and the multifunctional element. The multifunctional element can preferably be produced as a plastic component and even more preferably as a plastic injection-molded component. Furthermore, the contour can also have a coating or, for example, be equipped with a further component, such as a magnet, in order to be able to interact with the switching means.

In an advantageous embodiment, an advantage then results if the contour can be formed as a radial elevation on the surface area. The formation of the contour as a radial elevation enables a structurally cost-effective formation of the multi-functional element. Furthermore, two or more switching means can be contacted by means of a radial contour, i.e. a contour on a radially external surface. Furthermore, it is also conceivable to form two or more elevations on the surface area in order to operate one, two or more switching means. In particular, it is also conceivable to use a single switching means which interacts with two elevations, for example, so that exact position ascertainment of the multi-functional element can be enabled from different signal states. Furthermore, an operating element interacting with the switching means can also be inserted into the elevation, such as a magnet or a metallic conducting component.

If the multifunctional element has at least one further contour area, whereby the further contour area has an attenuating element, a further advantageous embodinvent of the invention thus results. The attenuating element can be formed as a single component with the multifunctional element and can be a plastic injection-molded component, for example. Furthermore, the multifunctional element can also have an additional attenuating element, for example, whereby the attenuating element can be formed from a rubber elastic material, for example. By integrating an attenuating element into the multifunctional element, a further function is provided with the multifunctional element in the latching device. The multi-functional element thus has the function of interplay with the drive means, manually and/or electrically, as an operating means for a ratchet pawl, for operation of the pawl, interaction with a switching means and an attenuating function. The large number of functions performed by the multifunctional element offers several advantages simultaneously. On the one hand, the number of needed components can be reduced, and, on the other hand, the multifunctional element enables a compact design for the latching device.

The attenuating element is preferably used as a stop attenuator. Starting from a starting position of the multifunctional element, in which the locking mechanism is preferably located in a main ratchet position and the backrest element is engaged with the latch holder, the multifunctional element reaches an end position after operation of the unbolting module in which the ratchet lever and/or the pawl was operated. The attainment of the end position of the multifunctional element can lead to a noise arising as the multifunctional element works against a stop, for example. If an attenuating element is now provided by means of the multi-functional element, the transfer of the multifunctional element from the starting position to the end position can thus be noise-attenuated. This leads in turn to an increase in convenience as the operator of the motor vehicle directly connects a high-quality latching system with optimized noise acoustics.

In a further design variant of the attenuating element, the further contour area can be formed as a radial extension on the surface area. The radial extension of the surface area enables a further structural advantage as the multi-functional element can also be engaged with spaced out contour areas of the latch housing. In turn, this offers the advantage of relocating the attenuating function to an area which is outside of the further functional elements of the latching device. Furthermore, the radial extension can also be engaged, for example, with a drive axis of a manual and/or motorized drive. Both the starting position and also the end position of the multifunctional element can thus be determined and/or attenuated by means of the attenuating element. A further function is thus assigned to the multifunctional element, i.e. that of position securing for the multifunctional element. The radial extension can thus be preferably formed as a single component with the multifunctional element.

In a further embodiment of the invention, the extension can be formed in multiple components and preferably in two components. A dual component formation can be advantageous to the extent that the radial extension functions as an attenuating element by the selection of the material itself. In turn, this offers the advantage that the attenuating element can be engaged with different areas of the latch housing or the latching device which, in turn, offers a structural advantage.

If the extension is fork-shaped, whereby a thickening is formed in the area of the fork-shaped extension, so that during stopping of the fork-shaped extension onto the latch housing the thickening becomes adjacent with a further section of the fork-shaped extension, thus a further advantageous embodiment variant of the invention results. In this advantageous design variant, the extension of the multifunctional element itself forms the attenuating element. Furthermore, this reduces the number of components and also enables limitation of the attenuating function.

On the one hand, an advantageous noise reduction can be attained by attenuation and, on the other hand, a position limitation of the multifunctional element can be attained. In particular, the attenuation behavior and the position of the end position of the multifunctional element, for example, can be determined by interplay of the radially extending fork-shaped extension of the attenuating element. Furthermore, the attenuating behavior can be set very precisely by a fork shape and, in particular, the geometric formation of the forks and, in particular, the fork component with a thickening. According to the distance between the thickening and the further fork component, the attenuation path and the attenuation behavior can be set in a defined manner in the end position of the multi-functional element, for example.

If the multifunctional element is formed as a single component, an advantageous design variant of the multifunctional element is thus offered. By means of a single-component form with a large number of functions of the multifunctional element, a structurally beneficial, cost-effective, space-saving option of an embodiment of an unbolting element or multifunctional element is provided. If the highest degree of safety is offered by high functionality, on the one hand, as for example positions can also be detected accurately, the convenience of the motor vehicle can be attained by a high-quality latching device acoustic on the other hand.

BRIEF DESCRIPTION OF DRAWINGS

Hereinafter the invention is explained in further detail with reference to the attached drawings on the basis of a preferred exemplary embodiment. However, the principle applies that the exemplary embodiment does not restrict the invention, but only constitutes an advantageous embodiment. The characteristics portrayed can be executed individually or in combination with other characteristics of the description and also the patent claims individually or in combination.

The following are shown.

DETAILED DESCRIPTION

Figure 1:
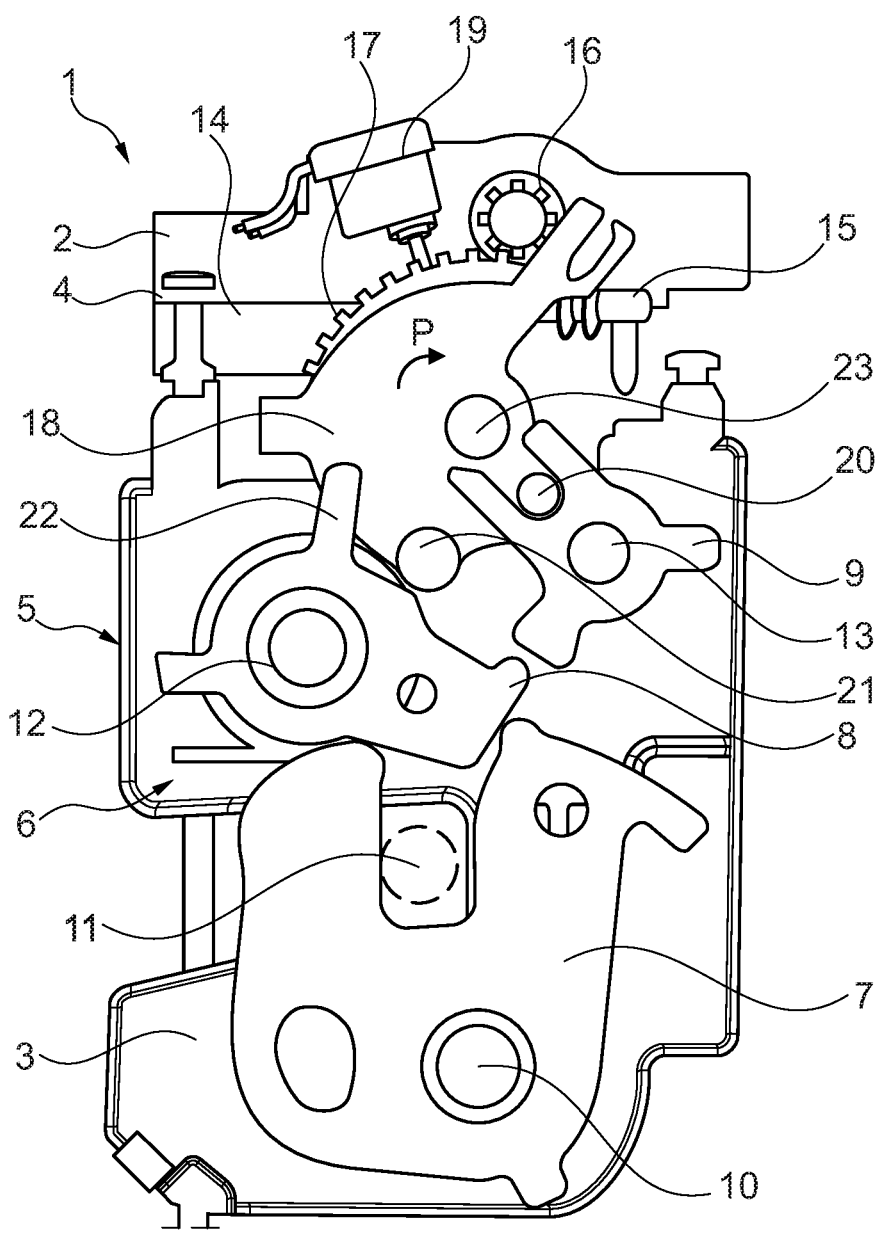
FIG. 1 a lateral view of a latch housing of a latching device for automotive applications, in particular of a backrest latch, consisting of an unbolting module and a basic module, FIG. 2 a detailed view of the multifunctional element in a three-dimensional view and detached from the latching device, and FIG. 3 a further detailed view of an embodiment of an attenuating element as a single-component extension of the multifunctional element.

A latching device 1 consisting of an unbolting module 2 and a basic module 3, is depicted in FIG. 1 in a lateral view. The unbolting module 2 and the basic module 3 are detachably connected to one another by means of a screw connection 4 and together form the latch housing 5.

The basic module contains the locking mechanism 6 consisting of a catch 7 and a pawl 8 engaging with the catch 7. In this embodiment, the pawl 8 is maintained in the shown main ratchet position of the locking mechanism 6 by means of a ratchet lever 9. The pawl 8 cannot be moved out of the locking engagement with the catch 7 due to stress by the catch 7. The catch 7 is pivotably accommodated around an axis 10 in the basic module 3 and engages with a latch holder 11. The pawl 8 and the ratchet lever 9 are respectively also pivotably maintained around an axis in the basic module 3 and can be pre-tensioned in one direction by means of spring elements.

In this embodiment, the unbolting module 2 is depicted as an electrical unbolting module 2. A pinion shaft is operated by means of an electrical drive 14 which drives a wormgear 15 in this exemplary embodiment. The wormgear 15 engages in turn with a gearwheel 16, whereby the gearwheel engages into a gearwheel segment 17. The gearwheel segment in turn drives a multifunctional element 18, whereby the unbolting element or multifunctional element 18 can be driven in the direction of the arrow P.

In addition, a switching means 19 is shown in FIG. 1 which is also accommodated in the unbolting module 2.

In the case of assembly of the unbolting module 2 with the basic module 3 to form the latch housing 5 the multifunctional element 18 engages directly with an operating pin 20 into the ratchet lever 9. A further operating pin 21 can be engaged with an arm 22 of the pawl 8. The multifunctional element 20 is rotatably accommodated around an axis 23 in the unbolting module 2.

Starting from a main ratchet position of the locking mechanism 6, as illustrated in FIG. 1, an operator can operate the electrical drive 14, whereby the operating chain is moved by the wormgear 15, the gearwheel 16, the gearwheel segment 17 and the multifunctional element 18, in the direction of the arrow P. In the case of a movement of the multifunctional element 18, the ratchet lever 9 is pivoted in an anti-clockwise direction, whereby the operating pin 20 pivots the ratchet lever. The ratchet lever 9 disengages with the pawl 8 in the process. Due to the pre-cut in the locking mechanism 2 the pawl 8 can now be moved out of the engagement area with the catch 7 or by means of the operating pin 21 in the engagement with the arm 22 moved out of the engagement area with the catch 7. The catch 7 is released and can release the latch holder 11. The backrest latch 1 is now opened so that a back seat bench backrest can be folded over, for example.

Figure 2:
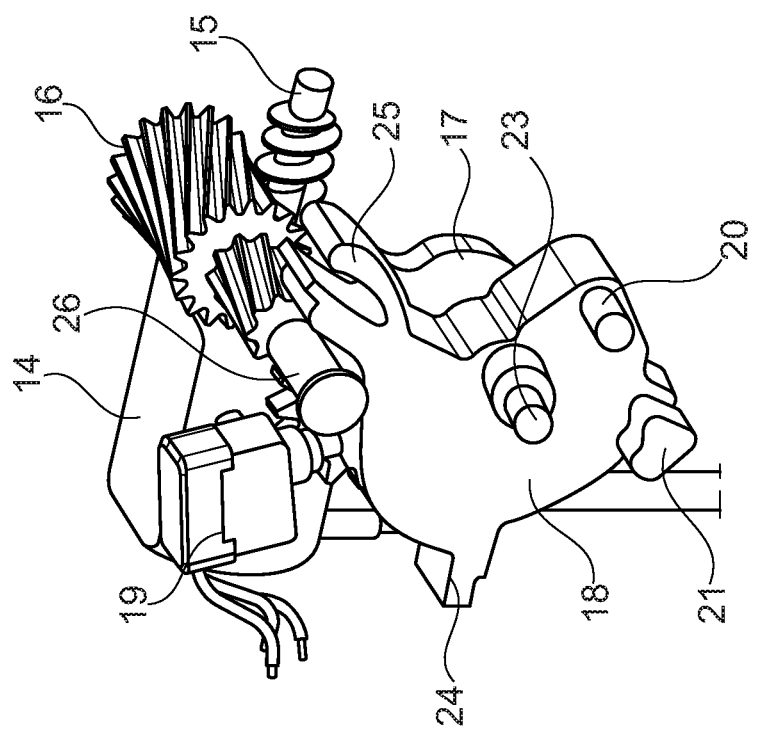

For further illustration of the functions of the multifunctional element 18, reference is made to FIG. 2. The same components are furnished with the same reference numerals. The multifunctional element 18 is reproduced in FIG. 2, detached from the unbolting module 2 or the housing of the unbolting module 2. The unbolting element 18 in turn is located in the starting position, as depicted in FIG. 1. The multifunctional element 18 has a radial elevation 24 which can be engaged with the switching means 19 during movement of the multi-functional element 18 in the clockwise direction. In addition, a fork-shaped extension 25 is molded on the multifunctional element 18 as a single component. The fork-shaped extension 25 engages with an axis 26 of the gearwheel 16. The axis 26 forms a stop contour for the fork-shaped extension 25. The fork-shaped extension can be formed elastically at least in places, so that an attenuating function can be attained by means of the fork-shaped extension 25.

Figure 3:
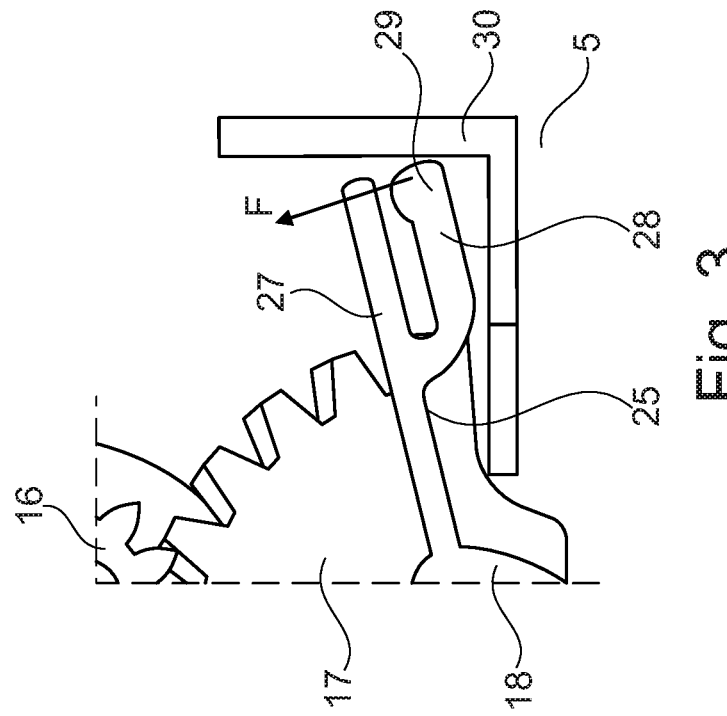

A fork-shaped extension 25 is reproduced in FIG. 3 in an enlarged illustration and is reproduced as an alternative embodiment. It must be apparent that the fork ends 27, 28 have a fundamentally identical thickness. The fork end 28 also has a thickening 29, whereby the thickening 29 is oriented in the direction of the second fork end 27. If the multifunctional element 18 now releases the locking mechanism 6 due to a manual and/or electrical operation of the multi-functional element 18, the first fork end 28 thus engages with a contour or edge 30 of the latch housing 5, whereby a force F is generated which produces elastic deformation of the fork end 28. The multifunctional element 18 is gently and quietly decelerated by deformation of the fork end 28. The multifunctional element 18 is decelerated until the thickening 29 engages against the second fork end 27, whereby an end position of the multifunctional element 18 can be defined.

As is clearly apparent from the Figures and in particular FIGS. 2 and 3, the multifunctional element has a large number of functions which range from unsecuring to unlocking and switching on to attenuating. The multifunctionality of the unbolting element 18 enables considerable reduction of the required components of the latching device 1 and simultaneously enables compact construction of the latch 1.

LIST OF REFERENCE SYMBOLS

1 Latching device, backrest latch
2 Unbolting module
3 Basic module
4 Screw connection
5 Latch housing
6 Locking mechanism
7 Catch
8 Pawl
9 Ratchet lever
10, 12, 13,
23, 26 Axis
11 Latch holder
14 Electrical drive
15 Worm
16 Gearwheel
17 Gearwheel segment
18 Multifunctional element, unbolting element
19 Switching means
20, 21 Operating pin
22 Arm
24 Radial extension
25 Fork-shaped extension
27, 28 Fork ends
29 Thickening
30 Edge
P Arrow
F Force

The invention claimed is:

1. A latching device for automotive applications, in particular a backrest latch to bolt and unbolt seat backrests in motor vehicles, the latching device comprising:
   a locking mechanism having a catch,
   at least one pawl, and
   an unbolting element for the locking mechanism, which unbolting element can be acted on manually and/or mechanically,
   wherein the unbolting element is a component of an exchangeable unbolting module and the unbolting module forms a latch housing together with a basic module accommodating the locking mechanism, and
   wherein the unbolting element is formed as a multifunctional element and at least a switching and/or attenuating function can be executed by the multifunctional element.

2. The latching device according to claim 1, wherein the multi-functional element is pivotably accommodated in the unbolting module and has a continuously segment-shaped surface area.

3. The latching device according to claim 1, wherein the multifunctional element has at least one contour formed on the surface area, whereby the contour can be engaged with a switching means.

4. The latching device according to claim 3, wherein the contour can be formed as a radial elevation on the surface area.

5. The latching device according to claim 1, wherein the multifunctional element has at least a further contour area, whereby an attenuating element can be formed by of the further contour area.

6. The latching device according to claim 1, wherein the further contour area can be formed as a radial elevation on the surface area.

7. The latching device according to claim 1, wherein the radial extension can be engaged with the latch housing.

8. The latching device according to claim 1, wherein the extension can be formed in multiple components, preferably two components.

9. The latching device according to claim 1, wherein the extension can be formed as a fork shape, whereby a thickening can be formed in the area of the fork-shaped extension, so that in stoppage of the fork-shaped extension to the latch housing the thickening becomes adjacent with a further section of the fork-shaped ex-tension.

10. The latching device according to claim 1, wherein the multifunctional element can be formed as a single component.

* * * * *